United States Patent
Jeong (10) Patent No.: US 10,055,075 B2
(45) Date of Patent: Aug. 21, 2018

(54) DISPLAY DEVICE AND METHOD FOR SENSING A BENDING OF THE DEVICE

(71) Applicant: LG Display Co., Ltd., Seoul (KR)

(72) Inventor: IlDoo Jeong, Seoul (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 15/238,441

(22) Filed: Aug. 16, 2016

(65) Prior Publication Data

US 2016/0357289 A1 Dec. 8, 2016

Related U.S. Application Data (63) Continuation of application No. 14/482,851, filed on Sep. 10, 2014, now Pat. No. 9,436,224.

(30) Foreign Application Priority Data

Oct. 28, 2013 (KR) .................. 10-2013-0128232

(51) Int. Cl.
*G06F 3/044* (2006.01)
*G06F 1/16* (2006.01)

(52) U.S. Cl.
CPC ............ *G06F 3/044* (2013.01); *G06F 1/1652* (2013.01); *G06F 2203/04102* (2013.01)

(58) Field of Classification Search
CPC .............. G06F 3/044; G06F 1/1652; G06F 2203/04102
See application file for complete search history.

(56) References Cited

U.S. PATENT DOCUMENTS

| | | | |
|---|---|---|---|
| 4,977,480 A * | 12/1990 | Nishihara | G01L 9/0072 361/283.4 |
| 7,395,717 B2 | 7/2008 | DeAngelis et al. | |
| 2003/0227441 A1 | 12/2003 | Hioki et al. | |
| 2006/0274036 A1 | 12/2006 | Hioki et al. | |
| 2007/0195010 A1 | 8/2007 | Toriumi et al. | |
| 2008/0303782 A1 | 12/2008 | Grant et al. | |
| 2012/0086666 A1 | 4/2012 | Badaye et al. | |
| 2013/0076675 A1 * | 3/2013 | Shin | G06F 3/0416 345/173 |
| 2013/0300677 A1 * | 11/2013 | Kim | G06F 3/0414 345/173 |
| 2014/0362023 A1 | 12/2014 | Fujii et al. | |

FOREIGN PATENT DOCUMENTS

| | | |
|---|---|---|
| CN | 102436784 A | 5/2012 |
| CN | 102929422 A | 2/2013 |
| CN | 103389822 A | 11/2013 |

* cited by examiner

*Primary Examiner* — Ariel Balaoing
(74) *Attorney, Agent, or Firm* — Birch, Stewart, Kolasch & Birch, LLP (57) ABSTRACT

The present invention relates to a display device including a panel which includes a plurality of electrodes which are arranged in parallel to each other, and a bending sensing unit that senses a bending of the panel by using a change in a capacitance between at least two electrodes among the plurality of electrodes.

18 Claims, 11 Drawing Sheets

DISPLAY DEVICE AND METHOD FOR SENSING A BENDING OF THE DEVICE

CROSS-REFERENCE TO RELATED APPLICATIONS

This application is a Continuation of U.S. application Ser. No. 14/482,851, filed on Sep. 10, 2014, which claims priority from and the benefit under 35 U.S.C. § 119(a) of Korean Patent Application No. 10-2013-0128232, filed on Oct. 28, 2013, the entire contents of all these applications are incorporated herein by reference for all purposes as if fully set forth herein.

BACKGROUND OF THE INVENTION

1. Field of the Invention

The present invention relates to a technology for a display device, and more particularly to, a technology for a display device which senses a bending of the device.

2. Description of the Related Art

With the development of the information society, various types of requirements for a display device for displaying an image are increasing and, recently, various display devices, such as a Liquid Crystal Display (LCD), a Plasma Display Panel (PDP), and an Organic Light Emitting Diode Display Device (OLED), are being used.

Recently, such display devices have been developed in the form of a flexible display device of which the panel may be bent. Although a general display device uses glass as a substrate so that a panel thereof is not bent, the flexible display device uses a plastic substrate so as to be folded or bent according to the user's will.

Meanwhile, the general display device may further include a touch input system by which a user can easily input information or a command. The touch input system receives user information or a user command by recognizing that a part of a human's body or a separate input device makes contact with a display device. Such a touch input system makes the user's manipulation easier by using a natural behavior in which the user touches a surface of the display device as the user input means.

Also, the flexible display device may include the touch input system. At this time, a user can naturally perform bending manipulation due to a foldable characteristic or a bendable characteristic of the flexible display device. When such a user's bending manipulation is used as a user input means, user manipulation inputs may become more diverse and easier.

SUMMARY OF THE INVENTION

An aspect of the present invention is to provide a technology of recognizing bending manipulation for the display device.

Another aspect of the present invention is to provide a technology of sensing a bending of a device by using an electrode used for touch sensing.

Yet another aspect of the present invention is to provide a technology of using bending manipulation for a display device as a user manipulation means.

In order to solve the aforementioned problems, an aspect of the present invention is to provide a display device including a panel including a plurality of electrodes which are located in parallel to each other; and a bending sensing unit that senses a bending of the panel by using a change in a capacitance between at least two electrodes among the plurality of electrodes.

Another aspect of the present invention is to provide a display device including a panel comprising Tx electrodes and Rx electrodes which intersect with the Tx electrodes; a touch sensing unit that senses a touch with respect to the panel by using a change in a capacitance between the Tx electrodes and a change in a capacitance between the Rx electrodes; and a bending sensing unit that senses a bending of the panel by using the change in the capacitance between the Tx electrodes and the change in the capacitance between the Rx electrodes.

As described above, the present invention can allow the user to perform an easy user manipulation input by recognizing bending manipulation for a display device.

Further, the present invention can sense bending without adding a new process by sensing the bending, using an electrode for touch sensing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EMBODIMENTS

Hereinafter, embodiments of the present invention will be described with reference to the accompanying drawings. In the following description, the same elements will be designated by the same reference numerals although they are shown in different drawings. Further, in the following description of embodiments of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component. Likewise, when it is described that a certain element is formed "on" or "under" another element, it should be understood that the certain element may be formed either directly or indirectly via a still another element on or under another element.

Figure 1:
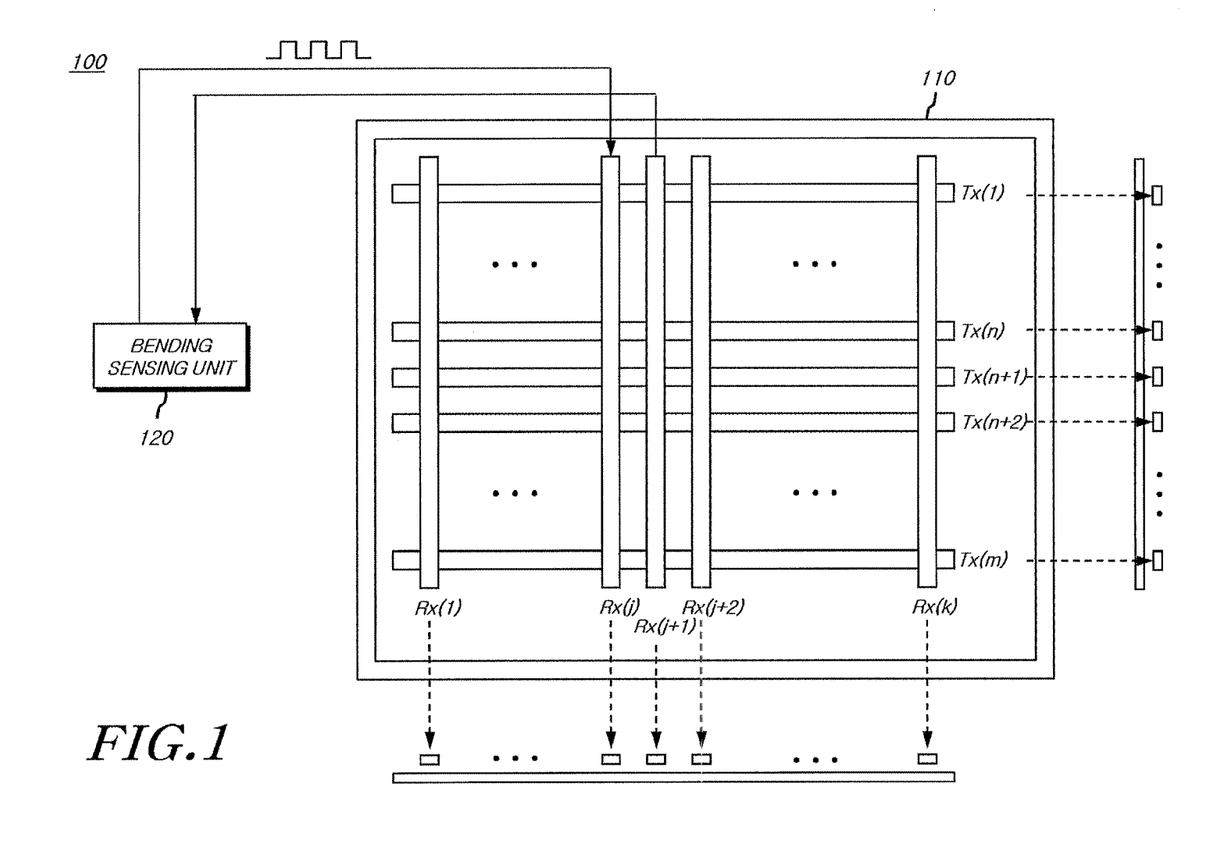
FIG. 1 illustrates a structure of a display device according to an embodiment of the present invention.

FIG. 1 illustrates a structure of a display device according to an embodiment.

Referring to FIG. 1, a display device 100 may include a panel 110 and a bending sensing unit 120. In FIG. 1, a figure illustrated below the panel 110 is a lower side view (lower side sectional view) of the panel 110, and a figure illustrated at a right side of the panel 110 is a right side view (right side sectional view) of the panel 110.

The panel 110 may include a plurality of electrodes which do not intersect with each other. For example, the panel 110 may include a plurality of electrodes arranged in parallel similar to Rx electrodes of FIG. 1.

Referring to FIG. 1, the panel 110 may further include intersection electrodes (e.g., Tx electrodes) which intersect with the plurality of electrodes (e.g., Rx electrodes) which do not intersect with each other, as well as the plurality of electrodes. The display device 100 according to an embodiment may include only the plurality of electrodes which do not intersect with each other. However, in order to further describe additional embodiments, FIG. 1 also illustrates the plurality of intersection electrodes which intersect with the plurality of electrodes. Further, the intersection electrodes are electrodes which do not intersect with each other, and may correspond to the "plurality of electrodes which do not intersect with each other" described in an embodiment.

Hereinafter, the Rx electrodes or the Tx electrodes illustrated in FIG. 1 are used as an example of the plurality of electrodes which do not intersect with each other or the intersection electrodes.

The bending sensing unit 120 senses a bending of the panel 110 by using a change in a capacitance between at least two electrodes among the Rx electrodes which do not intersect with each other.

The bending sensing unit 120 may measure or estimate the change in the capacitance by using two electrodes Rx(j) and Rx(j+1) in FIG. 1. Further, the bending sensing unit 120 may measure or estimate the change in the capacitance by using three or more electrodes Rx(j), Rx(j+1) and Rx(j+2). A capacitance implies an amount of charge accumulated between insulated conductors, and may be generated between two or more conductors which are not in contact with each other. Hereinafter, although an embodiment will be described which measures or estimates a change in a capacitance by using two electrodes, three or more electrodes may be used. (In FIG. 1, n denotes a natural number equal to or larger than 1, m denotes a natural number equal to or larger than 3, j denotes a natural number equal to or larger than 1, and k denotes a natural number equal to or larger than 3.)

Figure 2:
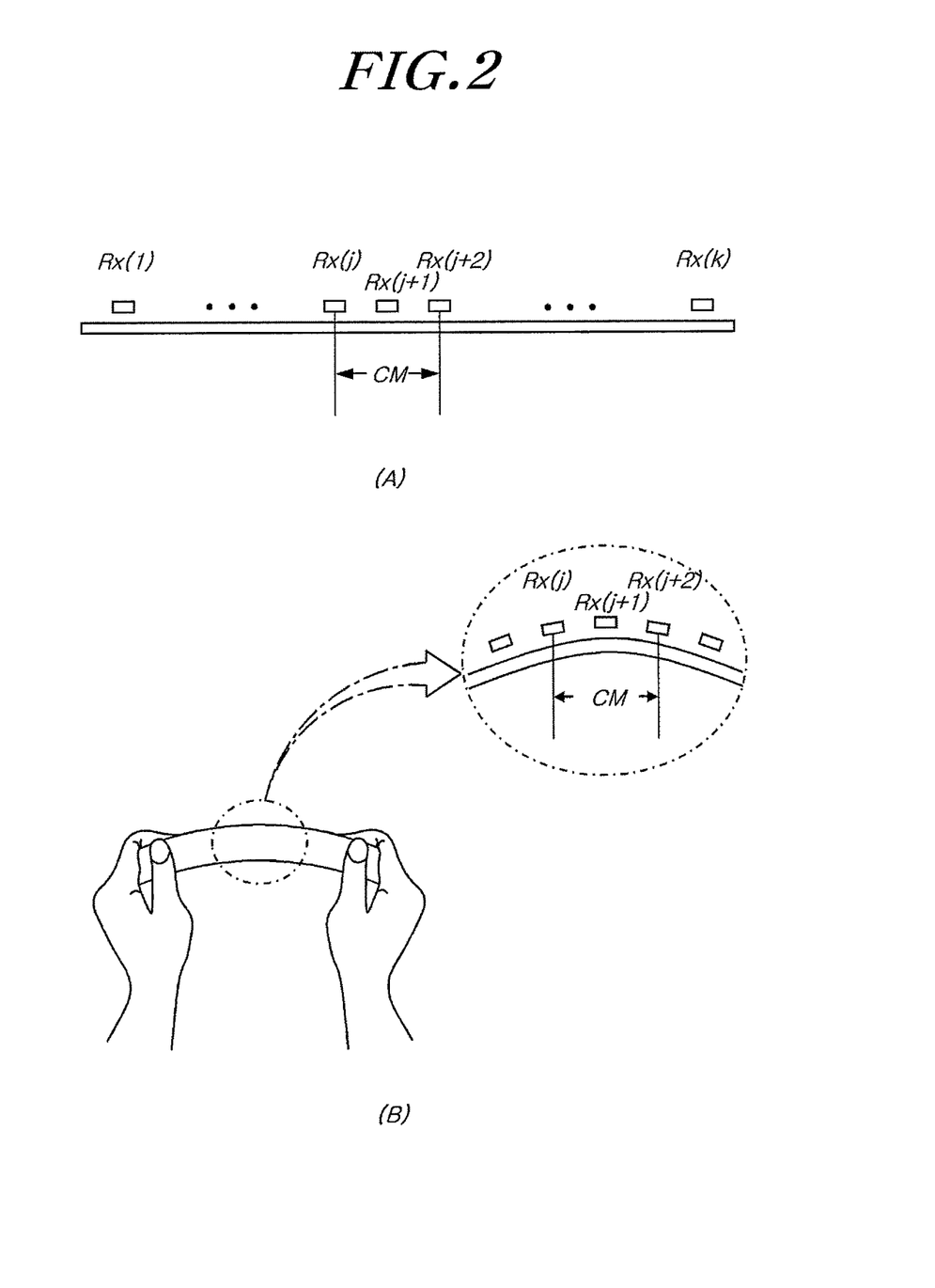
FIG. 2 illustrates a capacitance between two electrodes for sensing a bending according to an embodiment of the present invention.

FIG. 2 (FIGS. 2A and 2B) illustrates a capacitance between two electrodes for sensing a bending.

FIG. 2A is a lower side view of FIG. 1 and illustrates a capacitance CM between electrodes Rx(j) and Rx(j+2).

At this time, as illustrated in a left figure of FIG. 2B, when a force is applied to the panel 110, the panel 110 is bent. A right figure of FIG. 2 is an enlarged lower side view illustrating a bent portion of the panel 110. It can be identified with reference to the right figure of FIG. 2 that shapes and locations of the electrodes Rx(j) and Rx(j+2) constituting the capacitance CM are changed.

$$CM = \varepsilon(A/t) \qquad \text{Equation (1)}$$

(where permittivity of dielectric material located between two electrodes, A: Sectional area of two electrodes, and t: distance between two electrodes).

As indicated by Equation (1) above, the capacitance CM varies according to a sectional area A of the two electrodes Rx(j) and Rx(j+2), a distance t between the two electrodes, and a permittivity $\varepsilon$ of a dielectric material located between the two electrodes.

Referring to FIG. 2, the sectional area of the two electrodes increases as the panel 110 is bent. Further, the distance t between the two electrodes decreases as the panel 110 is bent. As such two variables A and t are changed to increase the capacitance, when the panel is bent, the capacitance CM has a larger value. Of course, as an example of changes in a shape and a location between such two electrodes, in accordance with a bent shape, the sectional area of the two electrodes may decrease, and a distance between the two electrodes may increase.

The bending sensing unit 120 senses a bending of the panel by measuring or estimating a change in the capacitance CM between the two electrodes Rx(j) and Rx(j+2), which varies according to the bending of the panel 110.

The bending of the panel 110 can be sensed by selecting at least two electrodes from among the plurality of electrodes arranged in the panel 110 and identifying a capacitance between the selected at least two electrodes.

FIG. 2 illustrates an electrode structure in which at least one other electrode (In FIG. 2, Rx(j+1)) is located between the two electrodes Rx(j) and Rx(j+2) between which a capacitance caused by the bending is measured. As the distance between the two electrodes becomes longer, when the panel 110 is bent, a change in the distance t between the two electrodes and a change in the sectional area A between the two electrodes may increase. As illustrated in FIG. 2, when a capacitance is measured by selecting two electrodes between which another electrode is located, a distance between the two electrodes becomes longer, so that the bending sensing unit 120 can identify a capacitance having a larger change amount.

Meanwhile, the two electrodes may be adjacent to each other, which is unlike FIG. 2.

Figure 3:
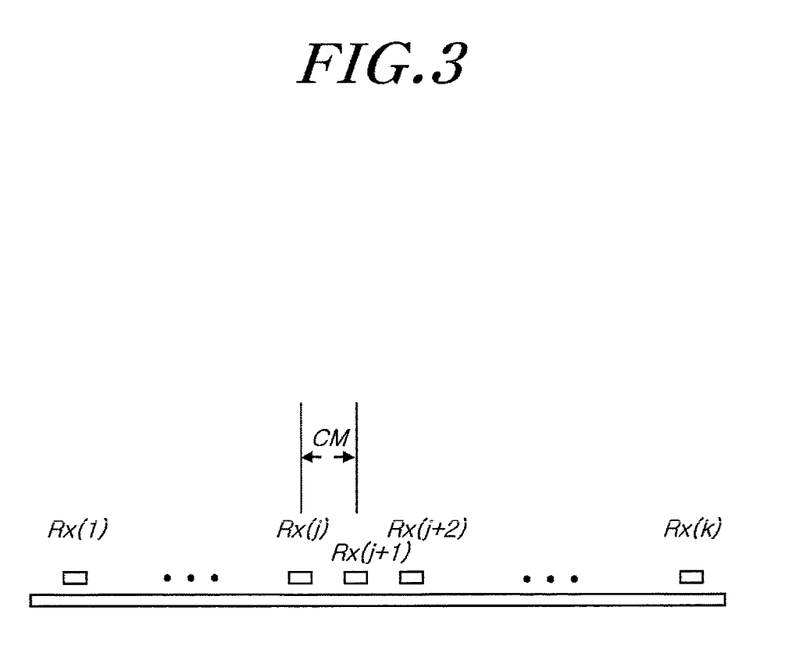
FIG. 3 illustrates locations of two electrodes for measuring a change in the capacitance according to an embodiment of the present invention.

FIG. 3 illustrates another embodiment about a location of two electrodes to measure a change in a capacitance, which is unlike FIG. 2.

Referring to FIG. 3, the bending sensing unit 120 can identify a change in a capacitance by selecting two adjacent electrodes (In FIG. 3, identifying a capacitance CM between electrodes Rx(j) and Rx(j+1)). As described above, the capacitance is in inverse proportional to a distance between two electrodes, so that as the two electrodes becomes far away from each other, the capacitance becomes smaller. When the capacitance becomes smaller, an error in measurement or an error caused by noise may be generated. In a case of the electrodes Rx(j) and Rx(j+1) of FIG. 3, when the capacitance is identified by selecting the two adjacent electrodes, the bending sensing unit 120 may decrease the error in the measurement or the error caused by the noise.

The panel 110 may be bent about two axes when viewed on the plane. An embodiment in which bending is sensed with respect to two axes on a plane will be described with reference to FIG. 4.

Figure 4:
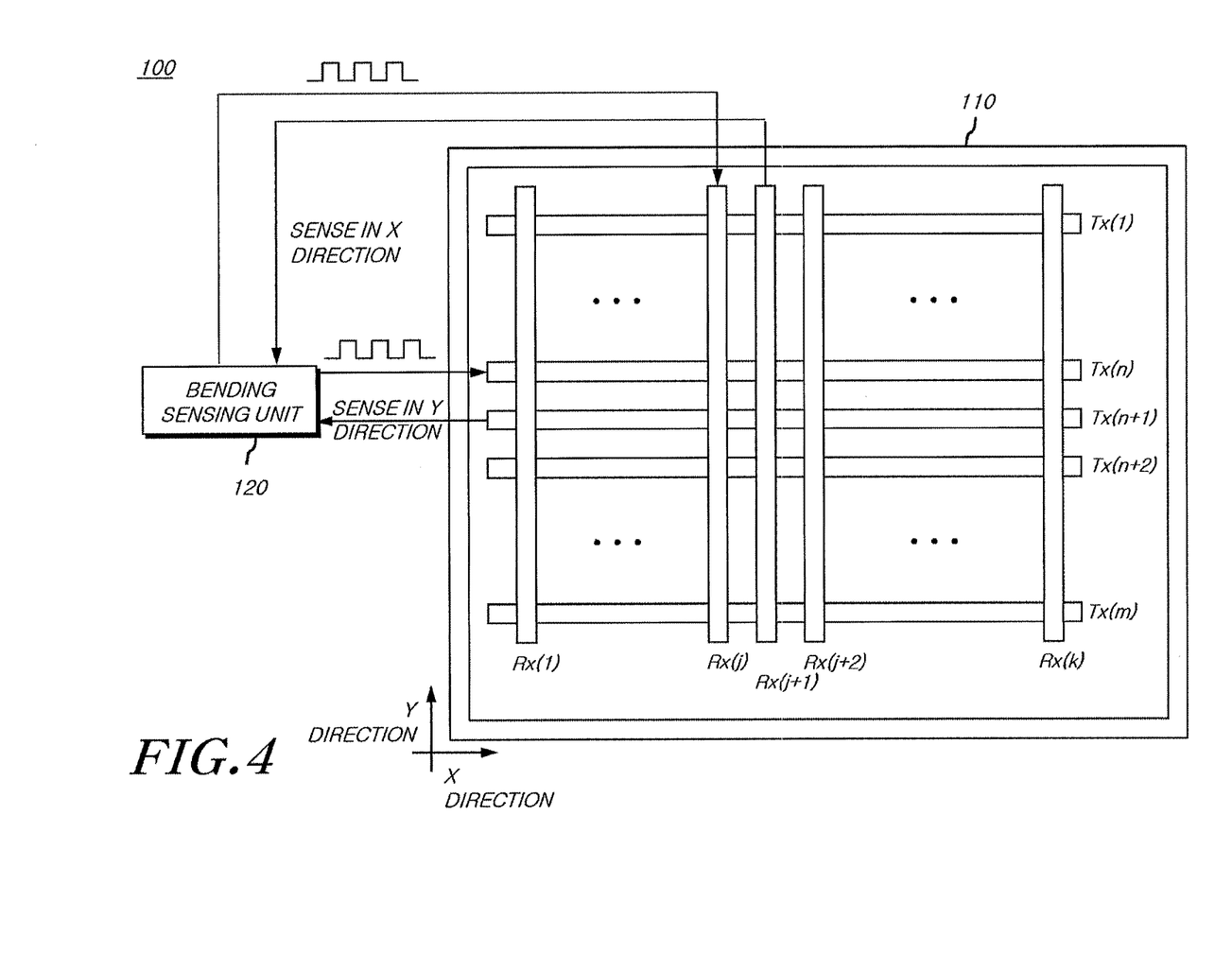
FIG. 4 illustrates a structure of a display device for sensing a bending with respect to two directions according to an embodiment of the present invention.

FIG. 4 illustrates a structure of a display device for sensing bending with respect to two directions.

Referring to FIG. 4, the panel 110 may include Rx electrodes arranged to be parallel to each other in the X direction and Tx electrodes arranged to be parallel to each other in the Y direction.

The bending sensing unit 120 may identify a change in a capacitance between the Rx electrodes to sense X-directional bending with respect to the panel 110. Further, the bending sensing unit 120 may identify a change in a capacitance between the Tx electrodes to sense Y-directional bending with respect to the panel 110.

Meanwhile, the bending sensing unit 120 may apply a driving signal to one of two electrodes and receive a response signal for the driving signal from the other one of the two electrodes, in order to measure a capacitance or a change in the capacitance between the two electrodes.

Figure 5:
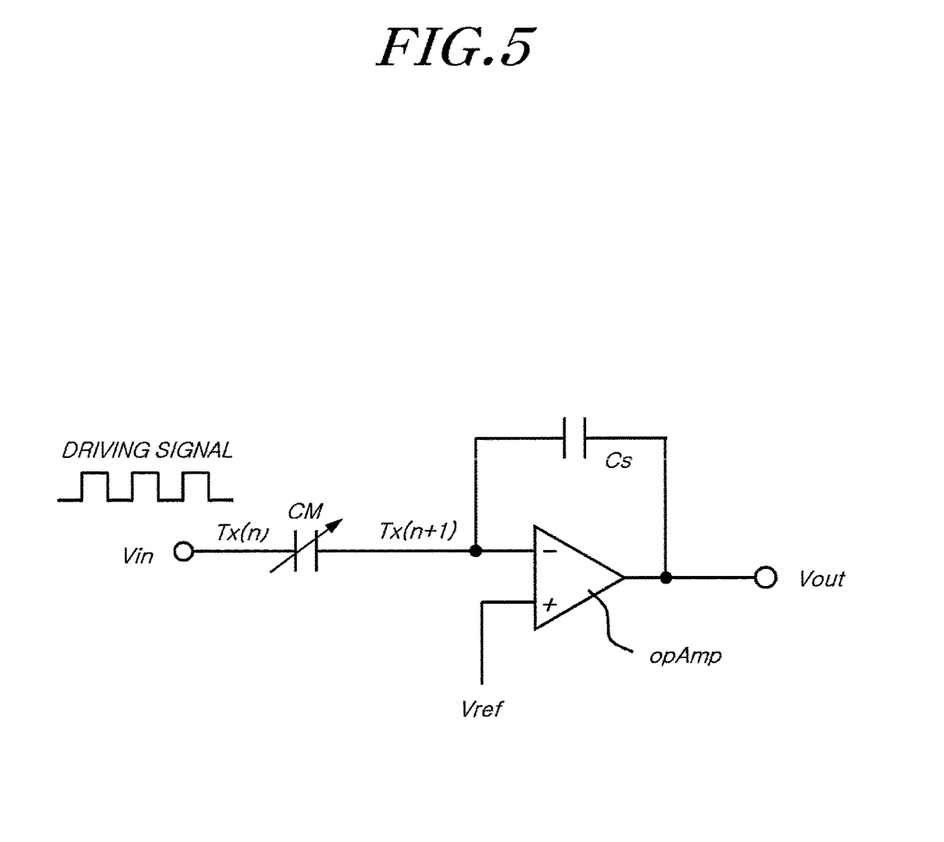
FIG. 5 is a circuit diagram illustrating a bending sensing unit for measuring a capacitance based on a driving signal, which is modeled, according to an embodiment of the present invention.

FIG. 5 is a circuit diagram illustrating a bending sensing unit for measuring a capacitance based on a driving signal, which is modeled.

Referring to FIG. 5, the bending sensing unit 120 applies a driving signal Vin to an electrode Tx(n) (one electrode among two electrodes), and a capacitance therebetween is to be measured. A capacitance CM between two electrodes Tx(n) and Tx(n+1) is formed. A driving signal having been applied to the electrode Tx(n) is transferred to the electrode Tx(n+1) (another electrode) through the capacitance CM and is converted in a form of a response signal. A waveform of the driving signal transferred to the electrode Tx(n+1) may vary according to an impedance of the capacitance CM and the electrode Tx(n+1), and a form of the varied waveform may be defined as a response signal. But, the present embodiment is not limited by such names.

At this time, the driving signal has a waveform of an Alternating Current (AC). Since the two electrodes Tx(n) and the Tx(n+1) are insulated, a driving signal having a waveform of a Direction Current (DC) cannot be transferred, and only a driving signal having a waveform of a Alternating Current (AC) can be transferred.

The bending sensing unit 120 receives a response signal formed by the electrode Tx(n+1) to input the response signal to an integrator (In FIG. 5, a portion formed by an opAmp and an integration capacitor Cs) so as to output an output Vout.

Such a final output Vout is varied according to a change in the capacitance CM.

Figure 6:
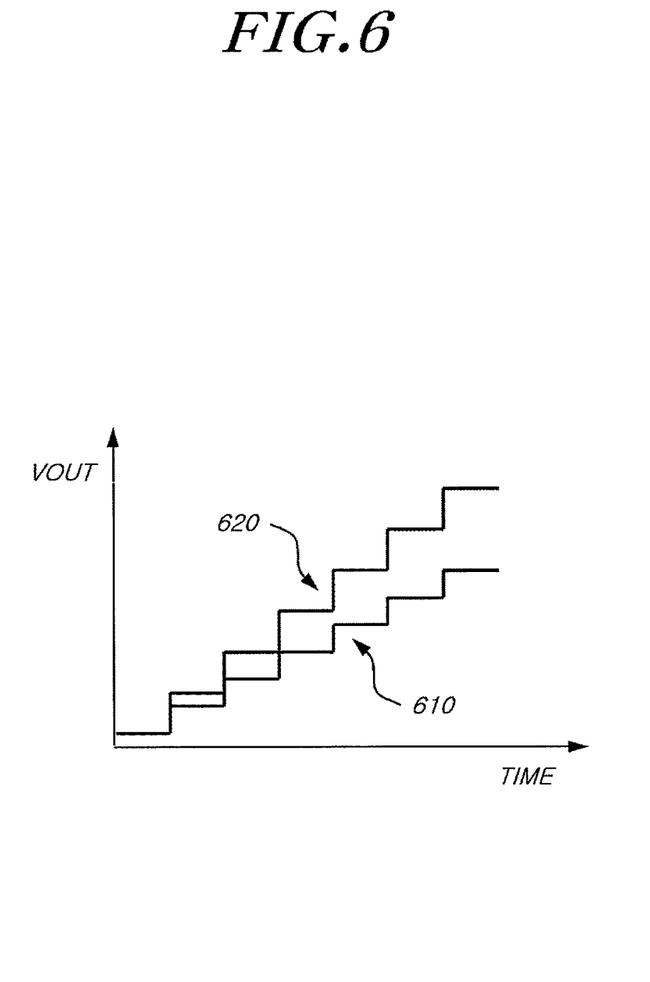
FIG. 6 is a graph depicting an output of Vout according to a change in the capacitance CM of FIG. 5.

FIG. 6 is a graph depicting an output Vout according to a change in the capacitance CM of FIG. 5.

In FIG. 6, a curved line 620 of which an increase amount is large corresponds to a graph with respect to an output Vout of when the panel 110 is bent, and a curved line 610 of which an increase amount is small corresponds to a graph with respect to an output Vout of when the panel 110 is not bent.

$Vout \propto CM/Cs$ Equation (2)

As indicated by Equation (2) above, the output Vout is proportional to a magnitude of the capacitance CM. As described with reference to FIG. 2, when the panel 110 is bent, the capacitance CM may increase due to a decrease in a distance between two electrodes or due to an increase in a sectional area of the two electrode. With the increase in the capacitance CM, as illustrated in FIG. 6, when the panel 110 is bent, the output Vout may become larger. However, it is just an example that the capacitance CM increases when the panel 110 is bent, and the capacitance CM may decrease according to a shape of the panel 110.

The capacitance CM is varied according to the shape of the panel 110, and such a variance may be measured by the output Vout through the circuit illustrated in FIG. 5. Further, the bending sensing unit 120 senses bending by using such an output Vout.

Meanwhile, although the bending sensing unit 120 may sense the bending by selecting only two electrodes among the plurality of electrodes arranged in the panel 110, the bending sensing unit 120 may also sense the bending by using all of the plurality of electrodes in order to acquire more detailed information related to the bending.

Figure 7:
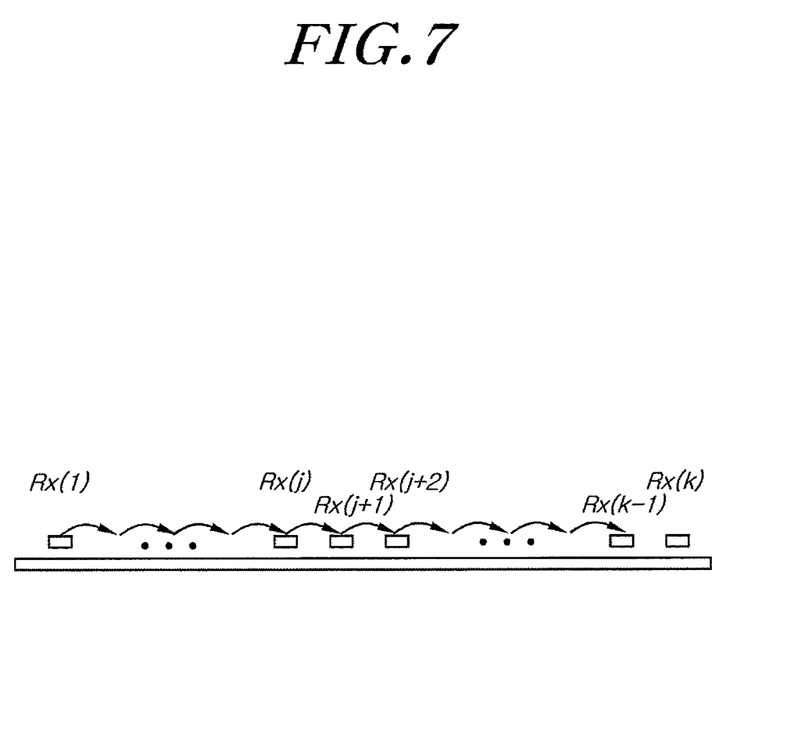
FIG. 7 illustrates a configuration for sequentially applying a driving signal to electrodes according to an embodiment of the present invention.

FIG. 7 illustrates a structure for sequentially applying a driving signal to a plurality of electrodes. FIG. 7 illustrates a sequence in which a driving signal is applied in the lower side view of the panel 110 of FIG. 1.

Referring to FIG. 7, the bending sensing unit 120 may apply a driving signal to an electrode Rx(1) among Rx electrodes. At this time, the bending sensing unit 120 may receive a response signal with respect to a driving signal applied to the electrode Rx(1), through an electrode Rx(2). As a result, the bending sensing unit 120 can identify a change in a capacitance between the electrodes Rx(1) and Rx(2), and can sense a bent state of the panel 110 at a location where the electrodes Rx(1) and Rx(2) are disposed.

Continuously, using the same scheme, the bending sensing unit 120 can sense a bent state of the panel 110 at a location where the electrodes Rx(j) and Rx(j+1) are disposed, by applying a driving signal to an electrode Rx(j) and receiving a response signal from an electrode Rx(j+1).

The bending sensing unit 120 can sequentially apply a driving signal to electrodes other than an electrode Rx(k) at a right end of the structure where the Rx electrodes are disposed. Further, since an electrode next to an electrode applying the driving signal (e.g., an electrode Rx(k) next to an electrode Rx(k−1)) receives a response signal with respect to the corresponding driving signal, a change in a capacitance between the two electrodes can be identified, so that the bent state of the panel 110 at the location where the two electrodes are disposed. Since the bending is sensed by the two electrodes, the driving signal need not be applied to the electrode at one end.

Although it is described with reference to FIG. 7 that the bending sensing unit 120 senses the bending by using the two adjacent electrodes, the bending sensing unit 120 may also sense the bending by using two electrodes between which one electrode is disposed (e.g., electrodes Rx(j) and Rx(j+2)). In this case, in FIG. 7, the driving signal need not be applied to two electrodes Rx(k−1) and Rx(k) at the right end.

Hereinabove, while the display device 100 according to an embodiment has been described with reference to FIGS. 1 to 7, it has been described that the panel 110 may include the plurality of electrodes which do not intersect with each other (In FIG. 1, Rx electrodes) and the plurality of intersection electrodes which intersect with the plurality of electrodes (In FIG. 1, Tx electrodes), and the Rx electrodes and the Tx electrodes may be used for sensing bending of the panel 110. Hereinafter, an embodiment in which the display device 100 senses a touch by using the Rx electrodes and the Tx electrodes will be described with reference to FIG. 8.

Figure 8:
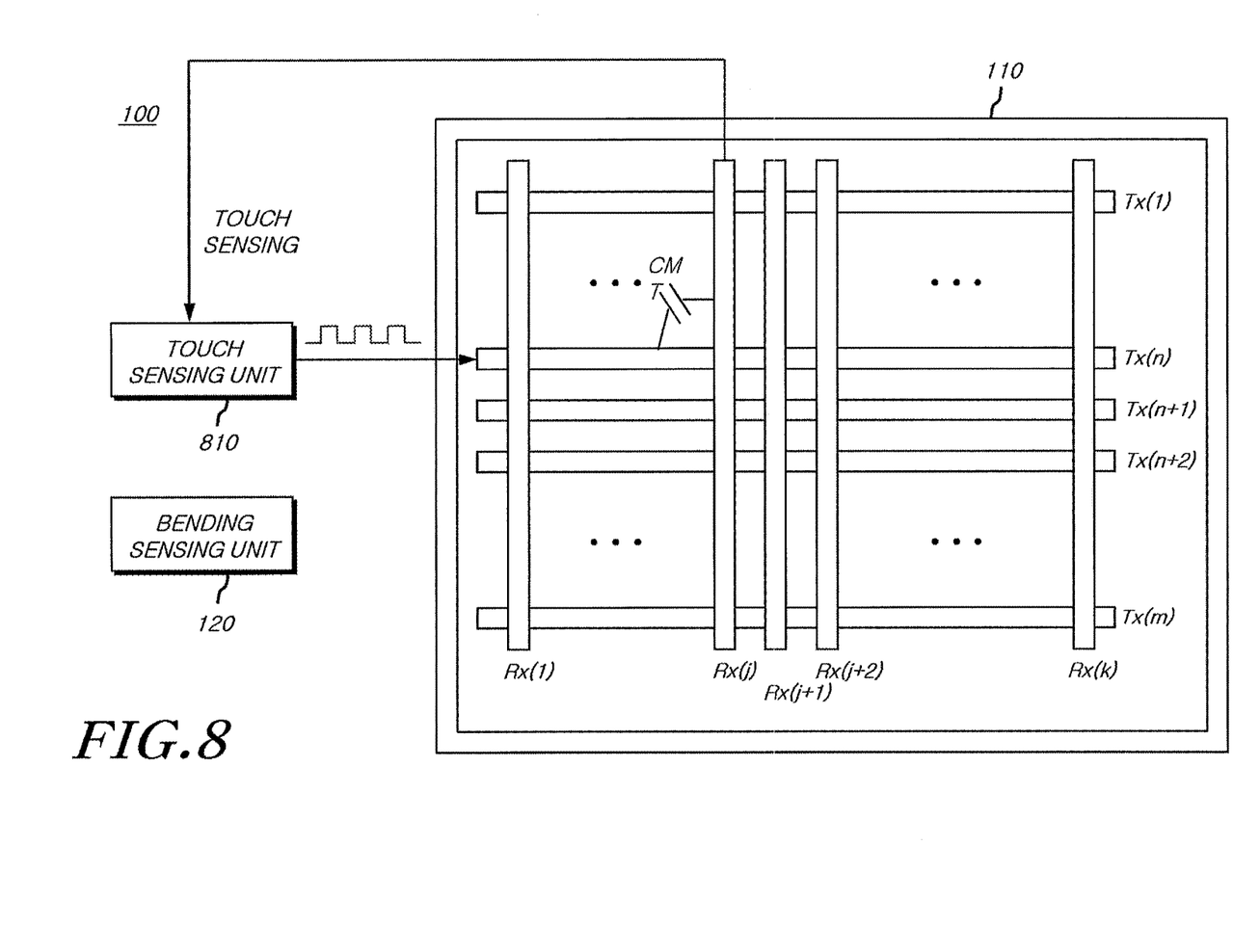
FIG. 8 illustrates a structure of a display device further including a touch sensing unit according to an embodiment of the present invention.

FIG. 8 illustrates a structure of a display device 100 further including a touch sensing unit 810.

Referring to FIG. 8, the display device 100 may have a structure obtained by adding the touch sensing unit 810 to the structure of FIG. 1.

The touch sensing unit 810 can recognize whether a part of a user's body or a separate input device touches (contacts) the panel 110. The touch sensing unit 810 may sense whether a touch is generated near an intersection point where two electrodes Tx(n) and Rx(j) intersect with each other, by applying a driving signal to the electrode Tx(n) among the Tx electrodes and receiving a response signal with respect to the driving signal from the electrode Rx(j) among the Rx electrodes.

A method of sensing a touch at one intersection point by the touch sensing unit 810 may be similar to the method of sensing bending by the bending sensing unit 120, which has been described with reference to FIG. 5. First, the touch sensing unit 810 applies the driving signal to the electrode Tx(n), At this time, the driving signal may have a waveform of an AC. Such a driving signal having the waveform of the AC is transferred to the electrode Rx(j) through a capacitance CMT formed between the electrodes Tx(n) and Rx(j), and the response signal is formed at the electrode Rx(j). The touch sensing unit 810 senses a touch by receiving the response signal at such an electrode Rx(j).

When a touch is generated, the capacitance (e.g., in FIG. 8, CMT) between the electrodes Tx and Rx at the corresponding touch point becomes smaller. Accordingly, the touch sensing unit 810 recognizes that a touch is generated at a point where a final output waveform (waveform corresponding to the output Vout in FIG. 5) becomes smaller, among points where the response signals are received.

The touch sensing unit 810 can recognize touch coordinates on the plane by sequentially applying the driving signal to the Tx electrodes and sequentially receiving the response signal from the Rx electrodes.

In this way, the display device 100 can sense the touch and the bending using the Tx electrodes and the Rx electrodes formed in the panel 110. When the display device 100 includes the panel 110 and the touch sensing unit 810, the display device 100 can sense both the touch and the bending by further adding the bending sensing unit 120 without installing additional electrodes in the panel 110. In contrast, when the display device 100 includes the panel 110 and the bending sensing unit 120, the display device 100 can sense both the touch and the bending by further adding the touch sensing unit 810 without installing additional electrodes in the panel 110.

The display device 100 to which the embodiment of FIG. 8 is applied senses the touch and the bending by using the same electrodes, so that the sensing operations of the touch and the bending may be performed at different time zones.

Figure 9:
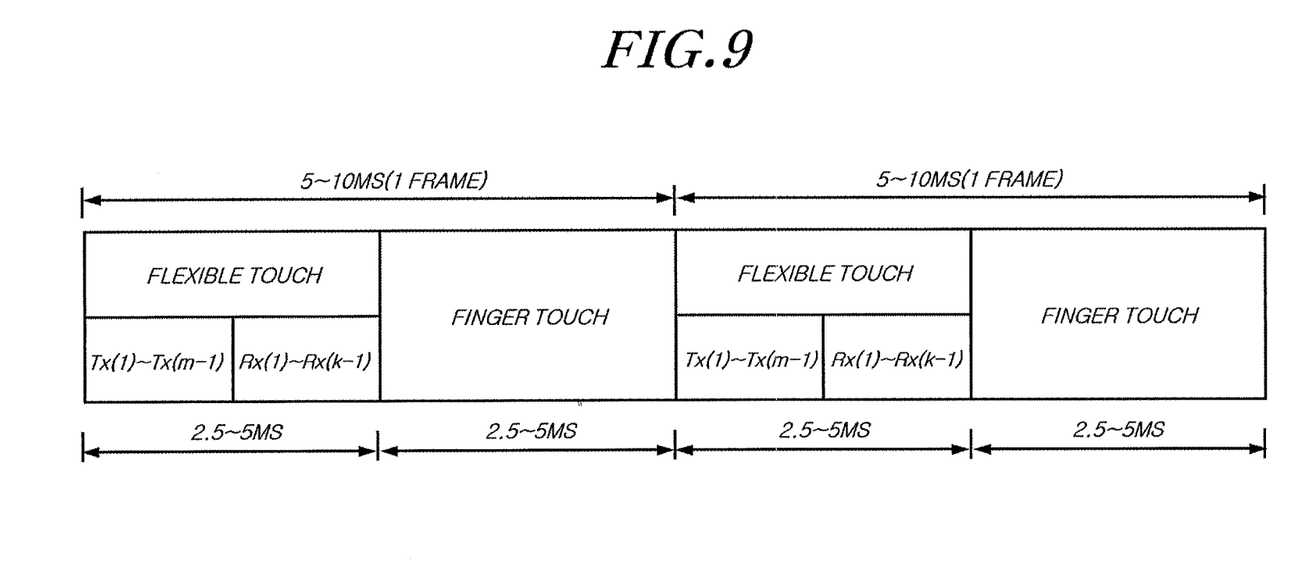
FIG. 9 is a timing chart illustrating a time zone when bending sensing and touch sensing are performed according to an embodiment of the present invention.

FIG. 9 is a timing chart illustrating a time zone when bending sensing and touch sensing are performed.

Referring to FIG. 9, the bending sensing unit 120 in the display device 100 first senses a bending in a direction in which the Tx electrodes are arranged (in FIG. 4, Y direction), by sequentially applying a driving signal to the Tx electrodes. Further, the bending sensing unit 120 senses a bending in a direction in which the Rx electrodes are arranged (in FIG. 4, X direction), by sequentially applying a driving signal to the Rx electrodes. Such bending sensing may be performed within a time period of 2.5 ms to 5 ms.

When the sensing with respect to the bending is completed, the touch sensing unit 810 senses a touch by sequentially applying a driving signal to the Tx electrodes and sequentially receiving a response signal from the Rx electrodes. Such touch sensing may be performed within a time period of 2.5 ms to 5 ms.

Referring to FIG. 9, the display device 100 may perform the bending and the touch within a time period of 5 ms to 10 ms, in which case the display device 100 may drive a frame with 100 Hz (in a case of 10 ms) to 200 Hz (in a case of 5 ms).

When the display device 100 can sense bending, such bending can be utilized as a user manipulation means. For example, when the display device 100 further includes an electronic calculator, the electronic calculator needs the user manipulation means (e.g., selection of "Yes" or "No") in order to process information. In this case, the bending sensing unit 120 can notify the electronic calculator of whether the panel 110 is bent, through the sensing, and when the panel 110 is bent, it is determined that a user selects "Yes" so that the electronic calculator can process the information. As can be seen in the present embodiment, the user can perform the user manipulation input only through the operation of folding or bending the display device 100 which is carried thereby.

Figure 10A:
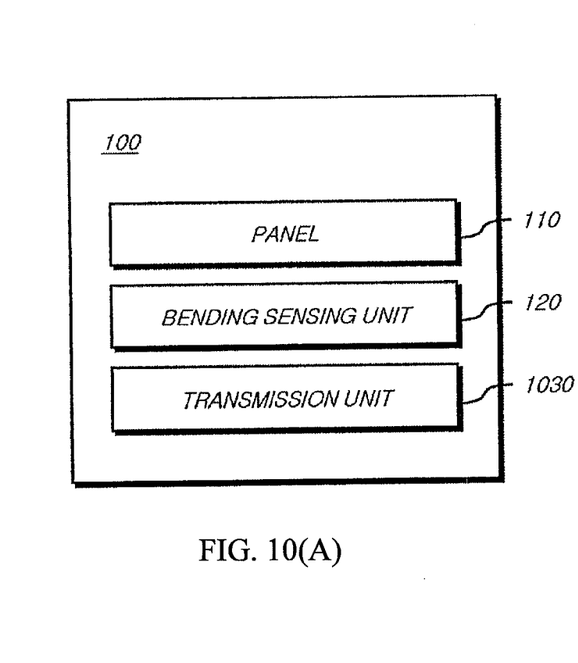
FIG. 10A is a block diagram illustrating a display device further including a transmission unit.
Figure 10B:
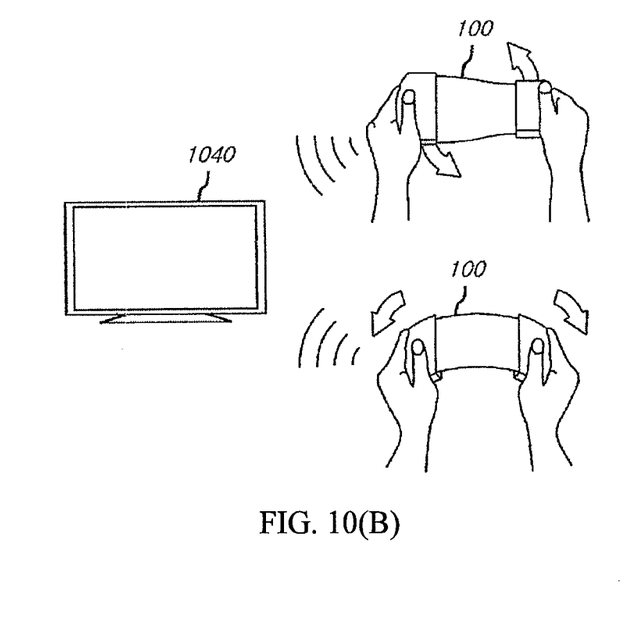
FIG. 10B illustrates an example of using the display device according to an embodiment of the present invention.

Another example where the bending sensing of the display device 100 is used as the user manipulation means will be described with reference to FIG. 10 (FIGS. 10A and 10B).

FIG. 10A is a block diagram illustrating a display device further including a transmission unit, and FIG. 10B illustrates an example of using the display device.

Referring to FIG. 10A, the display device 100 further includes a transmission unit 1030 which can transmit, to another device, information on bending of the panel 110 sensed by the bending sensing unit 120.

There may be various values included in the information on the bending (hereinafter, referred to as "bending information") transmitted by the transmission unit 1030. As the easiest example, the bending information may include a value indicating whether the panel 110 is bent or not. The bending sensing unit 120 can sense whether the panel 110 is bent or not, by comparing a capacitance when the panel 110 is bent with a capacitance when the panel 110 is not bent. The transmission unit 1030 may transmit, to another device, the bending information including the sensed value indicating whether the panel 110 is bent or not.

The bending information may include a value indicating a flexible distance. As illustrated in FIG. 5, since the value Vout is proportional to the capacitance CM, the bending sensing unit 120 can sense the value indicating the flexible distance by using the capacitance CM changed according to the flexible distance, and the value indicating the flexible distance may be transferred to another device while being included in the bending information.

In addition, the bending information may include coordinate values of a location where a magnitude of bending is large. As described with reference to FIG. 7, when sensing sequentially applying the driving signal to the Tx electrodes and the Rx electrodes to sense bending with respect to all of the electrodes, the bending sensing unit 120 can sense the coordinate values of the location where the magnitude of the bending is large.

The transmission unit 1030 may transmit, to another device, the bending information including various pieces of information on the bending.

Referring to FIG. 10B, the display device 100 converts various bending manipulations applied to the panel 110 into the bending information to transmit the converted bending information to another device 1040 by using the transmission unit 1030.

As described above, the bending sensing unit 120 can sense information on various types of bending (e.g., whether bending is generated, the flexible distance, the location of the bending), and such information on various types of bending is transferred to the another device 1040 through the transmission unit 1030. At this time, the another device 1040 can identify a content of user's bending manipulation by analyzing the transferred bending information. For example, the another device 1040 can identify whether a user twists the panel 110 or pulls the panel 110, by analyzing the value indicating the flexible distance and the coordinate values of the location where the bending is generated.

As a result, the user can use various types of bending manipulations as a user manipulation input to manipulate the another device 1040. The another device 1040 may be a game console. The game console may be a product manufactured only for playing a game, and may also be a game console having a dedicated platform and using a television as a display.

The display device 100 according to an embodiment may be used as a game manipulation device for such a game console. In particular, when the game console executes a physical interactive game, the display device 100 may be one manipulation means of the physical interactive game. The physical interactive game implies a game such as a sports game, in which a game user plays the game while moving with a character in the game. Such a physical interactive game needs a separate device for converting an activity of the game user into a user manipulation signal, and the display device 100 according to an embodiment may function as this type of separate device.

Meanwhile, the transmission unit 1030 may include a communication module for transmitting the bending information. The communication module may be a wired communication module or a wireless communication module. The wireless communication module may employ a short range communication scheme such as Wi-Fi, Bluetooth and infrared-ray communication.

Figure 11:
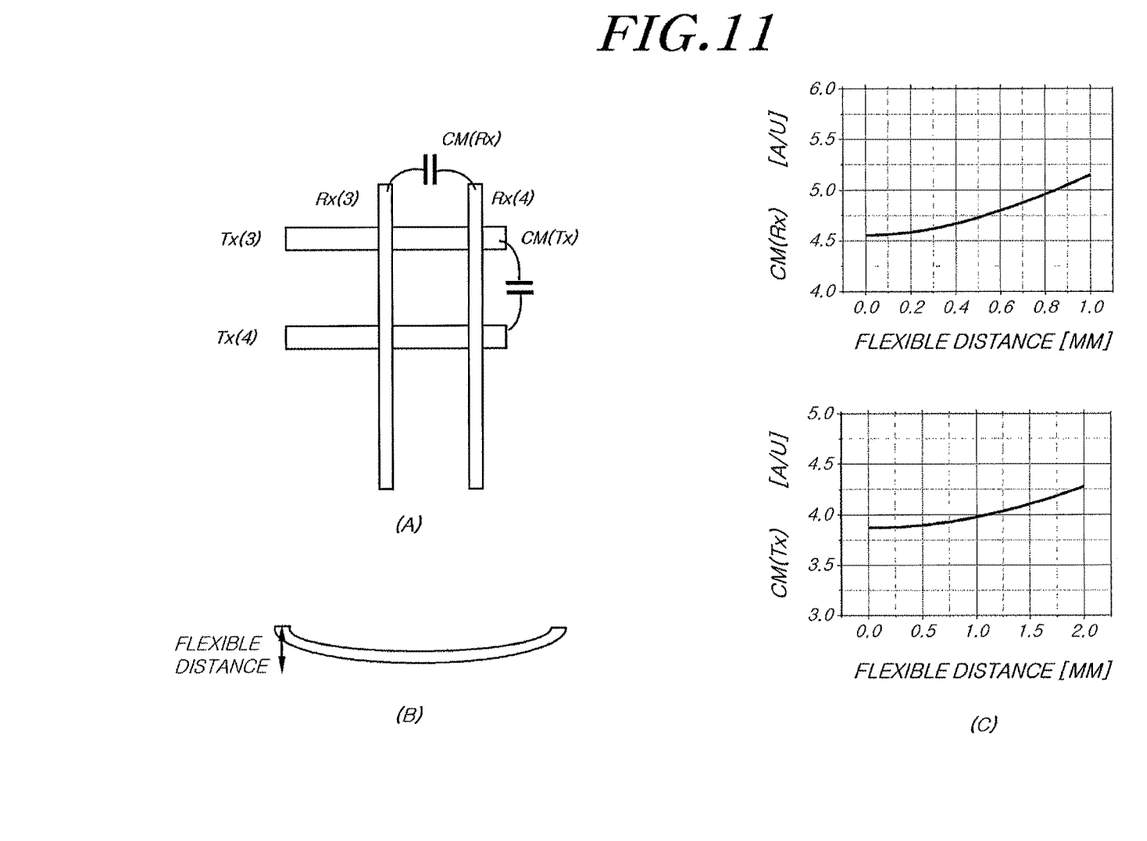
FIG. 11 illustrates a magnitude of a change in a capacitance according to a flexible distance according to an embodiment of the present invention.

It has been described in the embodiment described with reference to FIGS. 1 to 10 that the display device 100 can sense bending by using the change in the capacitance between the two electrode (two electrodes which do not intersect with each other), which is caused according to the bending of the panel 110. FIG. 11 (FIGS. 11A-11C) illustrates data of the change in the capacitance between the two electrodes, which is caused according to the bending of the panel 110.

FIG. 11C is a graph depicting an amount of a change in a capacitance according to a flexible distance. In detail, FIG. 11A illustrates locations of two electrodes between which a capacitance is measured, FIG. 11B illustrates an indicator indicating a flexible distance, and FIG. 11C is a graph depicting the capacitance between the two electrodes with respect to the flexible distance.

Referring to FIG. 11A, the change in the capacitance according to the flexible distance is measured with respect to two directions of the Rx electrodes and the Tx electrodes (a capacitance CM(Rx) between electrodes Rx(3) and Rx(4) and a capacitance CM(Tx) between electrodes Tx(3) and Tx(4) are measured). In addition, referring to FIG. 11B, the flexible distance is a height between a central portion and one end of the panel 110 when the panel 110 is bent.

In each case where the panel 110 is gradually bent, when the capacitances CM(Tx) and CM(Rx) are measured according to the height of each cases, it can be identified that the capacitances CM(Rx) and CM(Tx) between the two electrodes increase according to an increase in the flexible distance as illustrated in FIG. 11C.

As can be seen through data of FIG. 11, when the capacitance between the two electrodes which do not intersect with each other in the panel 110 is identified, the flexible distance of the panel 110 can be sensed. The sensing information on the bending may be utilized as a means which makes a user input easier.

Further, the terms "includes", "constitutes", or "has" mentioned above mean that a corresponding structural element is included unless they have no reverse meaning. Accordingly, it should be interpreted that the terms may not exclude but further include other structural elements. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although the embodiments of the present invention have been described for illustrative purposes, those skilled in the art will appreciate that various modifications, additions and substitutions are possible, without departing from the scope and spirit of the invention. Accordingly, the embodiments disclosed in the present invention are merely to not limit but describe the technical spirit of the present invention. Further, the scope of the technical spirit of the present invention is limited by the embodiments. The scope of the present invention shall be construed on the basis of the accompanying claims in such a manner that all of the technical ideas included within the scope equivalent to the claims belong to the present invention.

What is claimed is:

1. A sensing circuit for sensing a bending and a touch of a panel having first electrodes and second electrodes intersected with the first electrodes, the sensing circuit comprising:
a bending sensing unit sensing a change in a capacitance between at least two first electrodes among the first electrodes and a change in a capacitance between at least two second electrodes among the second electrodes; and
a touch sensing unit sensing a change in a capacitance between at least one electrode of the first electrodes and at least one electrode of the second electrodes,
wherein the change in the capacitance between at least two first electrodes among the first electrodes is obtained by a variation of a sectional area or a variation of a distance by bending in a first direction with respect to the panel or the change in the capacitance between at least two second electrodes among the second electrodes is obtained by a variation of a sectional area or a variation of a distance by bending in a second direction with respect to the panel.

2. The sensing circuit of claim 1, wherein the first electrodes are disposed in parallel to each other.

3. The sensing circuit of claim 1, wherein the second electrodes are disposed in parallel to each other.

4. The sensing circuit of claim 1, wherein the bending sensing unit senses the bending of the panel at a time point which is different from a time point of when the touch sensing unit senses a touch.

5. The sensing circuit of claim 1, wherein the bending sensing unit applies a driving signal to one electrode among the at least two first electrodes, receives a response signal with respect to the driving signal from the other electrode among the at least two first electrodes, and senses the capacitance between the one electrode and the other electrode according to the response signal.

6. The sensing circuit of claim 5, wherein an intergrator of the bending sensing unit is connected to the other electrode receiving the response signal.

7. The sensing circuit of claim 1, wherein the bending sensing unit applies a driving signal to one electrode among the at least two second electrodes, receives a response signal with respect to the driving signal from the other electrode among the at least two second electrodes, and senses the capacitance between the one electrode and the other electrode according to the response signal.

8. The sensing circuit of claim 7, wherein an intergrator of the bending sensing unit is connected to the other electrode receiving the response signal.

9. A display device comprising:
a panel comprising first electrodes and second electrodes which intersect with the first electrodes;
a touch sensing unit that senses a change in a capacitance between the first electrodes and the second electrodes; and
a bending sensing unit that senses a bending of the panel by using a change in a capacitance between at least two first electrodes among the first electrodes and by using a change in a capacitance between at least two second electrodes among the second electrodes,
wherein the change in the capacitance between at least two first electrodes among the first electrodes is obtained by a variation of a sectional area or a variation of a distance by bending in a first direction with respect to the panel or the change in the capacitance between at least two second electrodes among the second electrodes is obtained by a variation of a sectional area or a variation of a distance by bending in a second direction with respect to the panel.

10. The display device of claim 9, wherein the bending sensing unit senses the bending of the panel at a time point which is different from a time point of when the touch sensing unit senses a touch.

11. The display device of claim 9, wherein the bending sensing unit applies a driving signal to one electrode among the at least two first electrodes, receives a response signal with respect to the driving signal from the other electrode among the at least two first electrodes, and senses the capacitance between the one electrode and the other electrode according to the response signal.

12. The display device of claim 11, wherein an intergrator of the bending sensing unit is connected to the other electrode receiving the response signal.

13. The display device of claim 9, wherein the bending sensing unit applies a driving signal to one electrode among the at least two second electrodes, receives a response signal with respect to the driving signal from the other electrode among the at least two second electrodes, and senses the capacitance between the one electrode and the other electrode according to the response signal.

14. The display device of claim 13, wherein an intergrator of the bending sensing unit is connected to the other electrode receiving the response signal.

15. A method for sensing a bending of a panel of a display device, the method comprising:
applying a driving signal to one electrode among at least two electrodes of the panel of the display device;
receiving a response signal with respect to the driving signal from the other electrode among the at least two electrodes;
obtaining a change of a capacitance between the one electrode and the other electrode according to the response signal; and
sensing a bending in a first direction with respect to the panel by using the change in the capacitance between the at least two electrodes of the panel of the display device,
wherein the change in the capacitance between the one electrode and the other electrode is obtained by a variation of a sectional area or a variation of a distance by bending in a first direction with respect to the panel or the change in the capacitance between the one electrode and the other electrode is obtained by a variation of a sectional area or a variation of a distance by bending in a second direction with respect to the panel.

16. The method of claim 15, further comprising:
sensing a bending in a second direction with respect to the panel by using the change in the capacitance between the at least two electrodes among the electrodes.

17. The method of claim 16, further comprising:
sensing a change in a capacitance between one electrode of the electrodes and the other electrode of the electrodes for sensing a touch of the panel.

18. The method of claim 17, wherein a time point for sensing the bending of the panel is different from a time point of for sensing the touch of the panel.

* * * * *